United States Patent
Yoshida

(10) Patent No.: US 7,899,286 B2
(45) Date of Patent: Mar. 1, 2011

(54) OPTICAL COUPLING DEVICE

(75) Inventor: Haruhiko Yoshida, Funabashi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 230 days.

(21) Appl. No.: 12/182,591

(22) Filed: Jul. 30, 2008

(65) Prior Publication Data
US 2009/0087144 A1    Apr. 2, 2009

(30) Foreign Application Priority Data
Jul. 31, 2007   (JP) .............................. 2007-199454

(51) Int. Cl.
*G02B 6/26*   (2006.01)
*G02B 6/42*   (2006.01)
(52) U.S. Cl. .............................. 385/43; 385/39; 385/50
(58) Field of Classification Search ........................ None
See application file for complete search history.

(56) References Cited

U.S. PATENT DOCUMENTS

| 2004/0057667 A1* | 3/2004 | Yamada et al. ................. 385/43 |
| 2004/0114899 A1 | 6/2004 | Mattsson ..................... 385/129 |
| 2006/0018601 A1* | 1/2006 | Lipson et al. ................. 385/43 |

FOREIGN PATENT DOCUMENTS

JP   2004-133446   4/2004

OTHER PUBLICATIONS

Tsuchizawa, et al., "*Microphotonics Devices Based on Silicon Microfabrication Technology*", IEEE Journal of Selected Topics in Quantum Electronics, vol. 11, No. 1, Jan./Feb. 2005; pp. 232-240.

* cited by examiner

Primary Examiner—Tina M Wong
(74) Attorney, Agent, or Firm—Ohlandt, Greeley, Ruggiero & Perle, L.L.P.

(57) ABSTRACT

An optical coupling device for coupling an optical signal propagating in an optical fiber or space to an optical waveguide includes a lower cladding layer formed on a substrate, an optical waveguide formed on the lower cladding layer such that the tip of the optical waveguide points to an end portion of the lower cladding layer, and having a tapered distal end portion, and an upper cladding layer continuously formed on the lower cladding layer and on the distal end portion of the optical waveguide from the end portion of the lower cladding layer to the distal end portion of the optical waveguide, and having a refractive index higher than that of the lower cladding layer. The upper cladding layer draws light having entered the end portion of the lower cladding layer toward the upper cladding layer, and couples the light to the distal end portion of the optical waveguide.

15 Claims, 5 Drawing Sheets

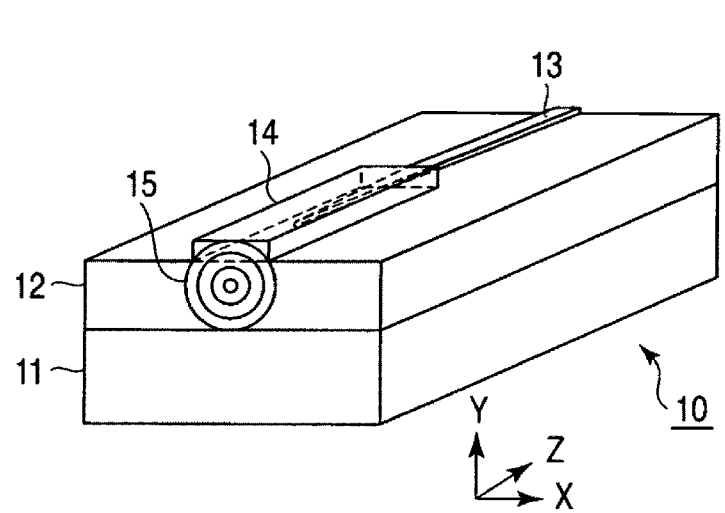
F I G. 1A
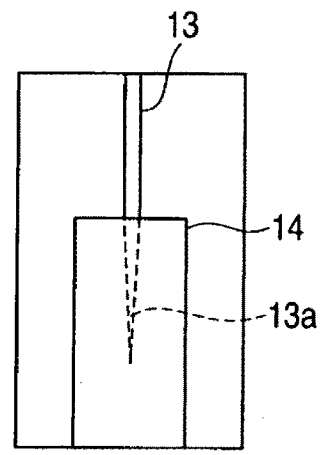
F I G. 1B
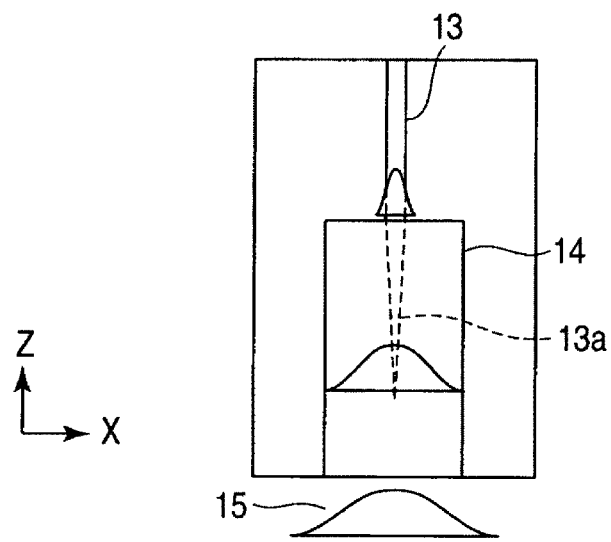
F I G. 2

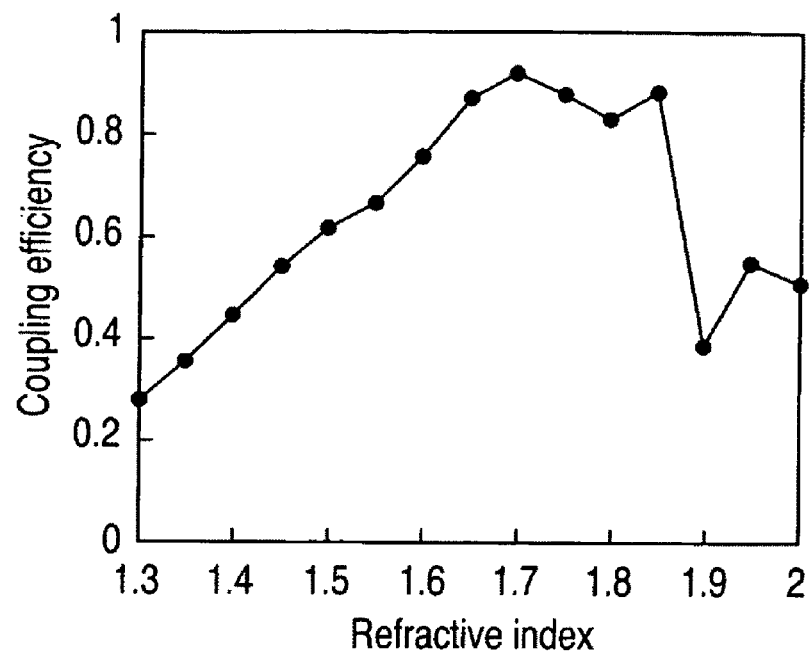
F I G. 4
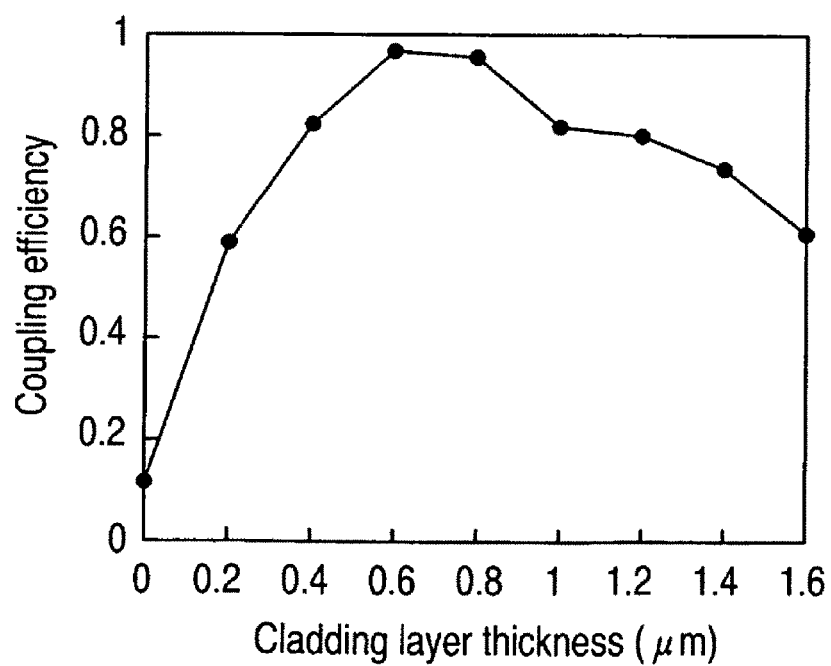
F I G. 5

OPTICAL COUPLING DEVICE

CROSS-REFERENCE TO RELATED APPLICATIONS

This application is based upon and claims the benefit of priority from prior Japanese Patent Application No. 2007-199454, filed Jul. 31, 2007, the entire contents of which are incorporated herein by reference.

BACKGROUND OF THE INVENTION

1. Field of the Invention

The present invention relates to an optical coupling device for coupling an optical signal propagating in an optical fiber or space to an optical waveguide.

2. Description of the Related Art

A spot size converter that performs high-efficiency optical coupling to a wire optical waveguide generally uses:

1) a method of suppressing the loss caused by the reflection or scattering of light by using a tapered structure that adiabatically compresses the mode sectional area of light; or 2) a method of combining the tapered structure and a clad for optical confinement (T. Tsuchizawa et al., IEEE Journal of Selected Topics in Quantum Electronics, Vol. 11, pp. 232-239, 2005)

The first method has a wide application range and is most often used. However, it is difficult to apply this method to optical coupling to an Si-wire waveguide for which the mode sectional area of light must be reduced by about two orders of magnitude from several μm×several μm to a few hundred nm×a few hundred nm. The second method using the advantage of silicon for which the advanced micropatterning techniques can be used is used for optical coupling to an Si-wire waveguide requiring the large reduction in mode sectional area as described above.

In an optical coupling device using the second method, a buried insulating film ($SiO_2$) of an SOI substrate is used as a lower cladding layer, a wire optical waveguide made of Si is formed on the lower cladding layer, and an upper cladding layer a few μm square made of a polymer or SiON is buried in this wire optical waveguide. The wire optical waveguide has a height of about 200 to 300 nm and a width of about 300 to 500 nm. A tapered structure serving as an input/output portion has a distal end width of 100 nm or less and a length of about 200 to 300 μm. Light having entered the upper cladding layer is gradually coupled with the silicon-wire waveguide in the tapered structure. Accordingly, 90% or more of light can be coupled with the wire waveguide when the taper length is about a few hundred μm.

Unfortunately, an optical coupling device of this kind has the following problem. That is, a three-dimensional structure several μm or more square is formed as the upper cladding layer by performing a process such as vapor deposition or annealing by using, e.g., a polymer such as polyimide resin or SiON. This makes it difficult to perform integration by matching the process with that of another optical device such as a light-receiving or light-emitting element and its electrode. This makes large-scale integration and mass production difficult.

BRIEF SUMMARY OF THE INVENTION

According to an aspect of the present invention, there is provided an optical coupling device including:

a lower cladding layer formed on a substrate, light entering through a side surface of one end portion of the lower cladding layer;

a stripe-like optical waveguide having a tapered distal end portion and formed on a portion of the lower cladding layer with a tip of the tapered distal end portion of the optical waveguide being directed to the one end portion of the lower cladding layer; and an upper cladding layer continuously formed on the lower cladding layer and the distal end portion of the optical waveguide from the one end portion of the lower cladding layer to the distal end portion of the optical waveguide, the upper cladding layer having a refractive index higher than that of the lower cladding layer, and configured to draw light having entered the lower cladding layer and couple the light to the distal end portion of the optical waveguide.

According to another aspect of the present invention, there is provided an optical coupling device including:

a fixing portion formed on a substrate and configured to fix an optical waveguide member; and an optical coupling portion formed on the substrate and optically coupled with the optical waveguide member, the optical coupling portion including a lower cladding layer formed on a substrate, and having one end portion whose side surface receives light from the optical waveguide member fixed to the fixing portion, a stripe-like optical waveguide having a tapered distal end portion and formed on a portion of the lower cladding layer with a tip of the tapered distal end portion of the optical waveguide being directed to the one end portion of the lower cladding layer, and an upper cladding layer continuously formed on the lower cladding layer and the distal end portion of the optical waveguide from the one end portion of the lower cladding layer to the distal end portion of the optical waveguide, having a refractive index higher than that of the lower cladding layer, and configured to draw light having entered the lower cladding layer and couple the light to the distal end portion of the optical waveguide.

According to Still another aspect of the present invention, there is provided an optical coupling device including:

a fixing portion formed on a substrate and configured to fix an optical waveguide member; and an optical coupling portion formed on the substrate and optically coupled with the optical waveguide member, the optical coupling portion including a lower cladding layer formed on a substrate, and having one end portion whose side surface receives light from the optical waveguide member fixed to the fixing portion, a stripe-like optical waveguide having a tapered distal end portion and formed on a portion of the lower cladding layer with a tip of the tapered distal end portion of the optical waveguide being directed to the one end portion of the lower cladding layer, and an upper cladding layer continuously formed on the lower cladding layer and the distal end portion of the optical waveguide from the one end portion of the lower cladding layer to the distal end portion of the optical waveguide, having a refractive index higher than that of the lower cladding layer, and configured to draw light having entered the lower cladding layer and couple the light to the optical waveguide through the distal end portion of the optical waveguide.

BRIEF DESCRIPTION OF THE SEVERAL VIEWS OF THE DRAWING

FIGS. 1A and 1B are respectively a perspective view and plan view showing an outline of the arrangement of an optical coupling device according to the first embodiment;

FIG. 2 is an exemplary view showing the intensity distributions in different portions of spot light having entered a lower cladding layer of the optical coupling device of the first embodiment;

FIG. 4 is a graph showing the dependence of the coupling efficiency on the refractive index in the optical coupling device of the first embodiment;

FIG. 5 is a graph showing the dependence of the coupling efficiency on the cladding layer thickness in the optical coupling device of the first embodiment;

DETAILED DESCRIPTION OF THE INVENTION

Figure 3:
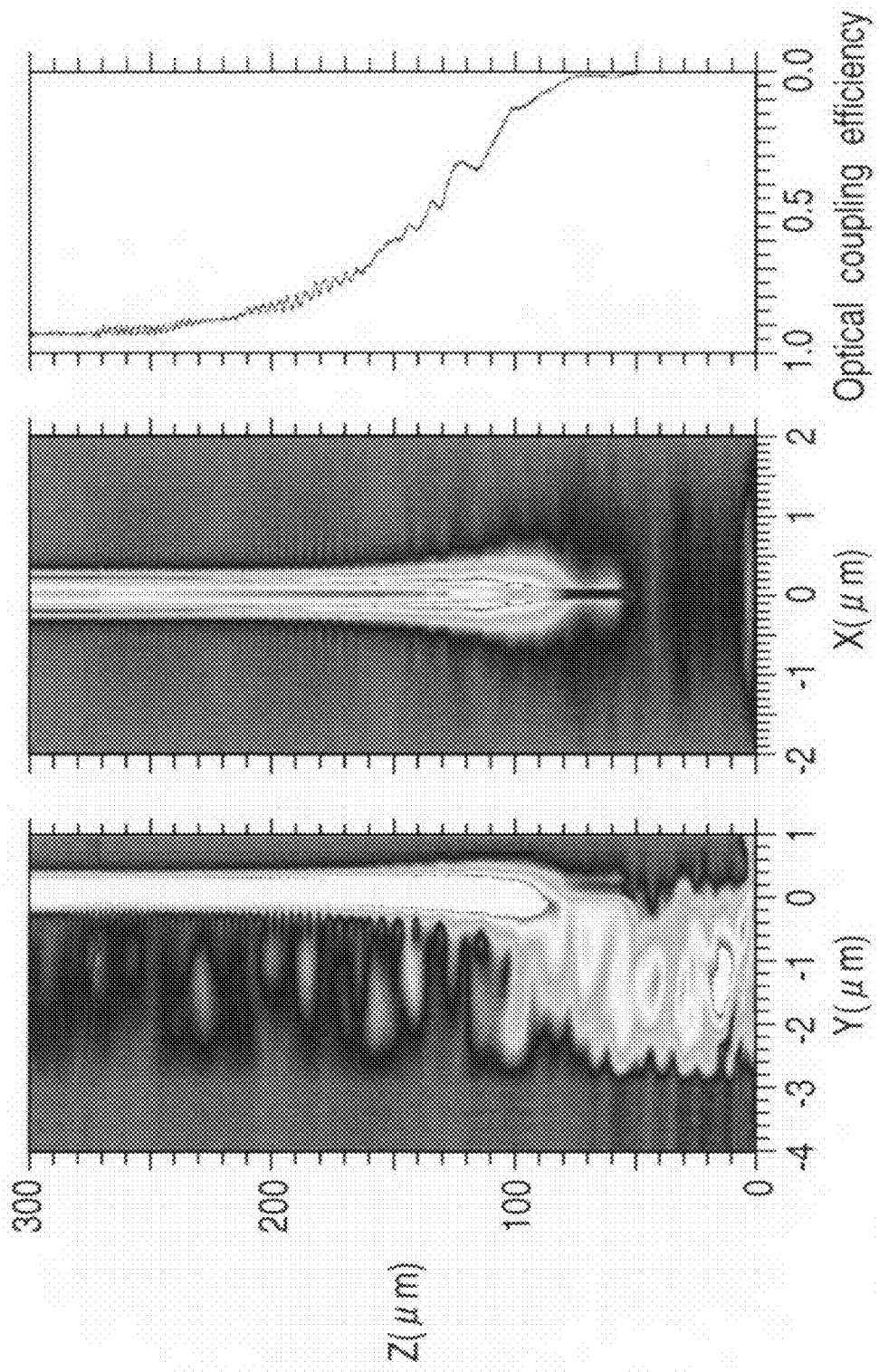
FIGS. 3A to 3C are views showing the way light propagates in the optical coupling device of the first embodiment.

Embodiments of the present invention will be explained in detail below.

First Embodiment

As shown in a perspective view of FIG. 1A, a lower cladding layer 12 made of an $SiO_2$ film is formed on an Si substrate 11. Light enters from a side surface of one end portion of the lower cladding layer 12. A wire optical waveguide 13 made of Si is formed on a portion of the lower cladding layer 12 so as to be slightly spaced apart from the end portion of the lower cladding layer 12. In addition, as shown in a plan view of FIG. 1B, a distal end portion 13a of the Si-wire optical waveguide 13 is tapered. That is, the optical waveguide 13 is formed on a portion of the lower cladding layer 12 such that the tip of the optical waveguide 13 points to one end portion of the lower cladding layer 12, and the distal end portion 13a is tapered.

The lower cladding layer 12 has a thickness of 3 μm. The Si-wire optical waveguide 13 has a thickness of 250 nm and a width of 450 nm. The width of the tip of the distal end portion 13a of the Si-wire optical waveguide 13 is 80 nm.

An upper cladding layer 14 having a width equivalent to the spot diameter of light entering the lower cladding layer 12 is formed on the lower cladding layer 12 and on the distal end portion 13a of the optical waveguide 13. That is, the upper cladding layer 14 is continuously formed from one end portion of the lower cladding layer 12 to the distal end portion 13a of the optical waveguide 13. The upper cladding layer 14 draws light having entered the lower cladding layer 12 and couples the light to the distal end portion 13a of the optical waveguide 13. The upper cladding layer 14 is made of a material, such as SiON, having a refractive index higher than that of the lower cladding layer 12.

The basic structure described above can be implemented by an SOI substrate. That is, the lower cladding layer 12 is a buried insulating film ($SiO_2$ film) of an SOI substrate 10, and the optical waveguide 13 is formed by processing an Si layer of the SOI substrate 10 into a thin line. FIGS. 1A and 1B illustrate only the optical coupling device formation region of the SOI substrate 10. Therefore, various devices such as a light-emitting device and light-receiving device and interconnects are formed in other regions.

In this embodiment, light 15 from an optical fiber or the like enters the lower cladding layer 12 instead of the upper cladding layer 14. The light having entered the lower cladding layer 12 and propagating in it is drawn by the upper cladding layer 14 having a high refractive index and focused on the upper surface side of the lower cladding layer 12. Then, the light efficiently couples to the tapered distal end portion 13a of the optical waveguide 13.

FIG. 2 shows the intensity distributions in different portions of the spot light 15 having entered the lower cladding layer 12. The spot of the incident light having entered the lower cladding layer 12 converges by the upper cladding layer 14 having a refractive index higher than that of the lower cladding layer 12, so the spot size decreases in a region where the upper cladding layer 14 exists. Since the light couples to the wire optical waveguide 13 having a refractive index higher than that of the upper cladding layer 14, the spot size further decreases in the wire optical waveguide 13.

FIGS. 3A to 3C illustrate the way light propagates in the optical coupling device. FIG. 3A is a view showing the distribution of light in the thickness direction (Y direction) when the optical coupling device is viewed from a side surface. FIG. 3B is a view showing the distribution of light in the widthwise direction (X direction) when the optical coupling device is viewed from the upper surface. The light intensity is high in a white portion in each drawing. FIG. 3C shows the optical coupling efficiency in the direction (Z direction) in which light propagates. FIGS. 3A to 3C reveal that light having entered the lower cladding layer 12 is drawn by the upper cladding layer 14 as the light propagates in the lower cladding layer 12, and efficiently coupled with the optical waveguide 13.

In this embodiment as described above, in the structure of an optical coupling device capable of flattening the input/output portion of an optical interconnect, the thickness of the upper cladding layer 14 is made smaller than the wavelength of light (the wavelength÷the refractive index of the upper cladding layer 14) inside the upper cladding layer 14. Note that the refractive index of the upper cladding layer 14 is increased to such an extent that light having entered the lower cladding layer 12 is sufficiently strongly drawn to the upper cladding layer 14 and the tapered portion 13a of the wire optical waveguide 13. In this case, the upper cladding layer 14 confine only a small portion of light. However, the upper cladding layer 14 draws light having entered the lower cladding layer 12 toward the upper cladding layer 14, and helps mode matching of coupling light in the tapered portion 13a.

In this state, the refractive index and thickness of the upper cladding layer 14 desirably have the following relationship. That is, letting $n_1$ be the refractive index of the upper cladding layer 14 and $\lambda$ be the wavelength of incident light, a thickness $d_1$ of the upper cladding layer 14 is made larger than a thickness $d_0$ of the optical waveguide 13, and smaller than a wavelength $\lambda/n_1$ of light in the upper cladding layer 14. This relationship is indicated by $$d_0 \leq d_1 \leq \lambda/n_1 \quad (1)$$

In this state, no light is guided in the upper cladding layer 14. However, high-efficiency optical coupling to the Si-wire optical waveguide 13 is possible if the effective refractive index of the structure combining the upper cladding layer 14 and the tapered portion 13a of the Si-wire optical waveguide 13 is sufficiently high and mode matching is favorable.

On the other hand, the lower cladding layer 12 (a refractive index $n_2$) must satisfy $$d_2 \geq \lambda/n_2 \quad (2)$$

in order to guide light having the wavelength $\lambda$. Note that in this case, to suppress the spread of light in the lateral direction by improving optical confinement in that direction, a width $W_1$ of the upper cladding layer 14 desirably satisfies $$W_1 \geq r \quad (3)$$

where r is the spot diameter of incident light. When the spot diameter r is about 3 μm, the width $W_1$ is preferably 3 to 6 μm. That is, if the width $W_1$ of the upper cladding layer 14 is too large, the spread in the lateral direction cannot be suppressed any longer. Therefore, the upper limit of $W_1$ is desirably about 2r.

Also, when light enters the $SiO_2$ layer (the lower cladding layer 12, the refractive index is 1.44 at a wavelength of 1.55 μm) of the SOI substrate, the light may leak to the Si substrate 11 having a high refractive index (the refractive index is 3.48 at a wavelength of 1.55 μm). However, beam light well collimated to have a spot size of a few μm can be guided a length of a few hundred μm with almost no loss, because the reflectance in the $SiO_2$/Si interface is high. While the light is guided to the lower cladding layer 12, the light can be coupled with the tapered portion 13a of the Si-wire optical waveguide 13 having a high mode matching. To suppress the light leakage to the Si substrate 11, the spot diameter r of the incident light, the thickness $d_1$ of the upper cladding layer 14, and the thickness $d_2$ of the lower cladding layer 12 need only satisfy the condition indicated by $$d_1 + d_2 \geq r \quad (4)$$

The dependence of the coupling efficiency upon the refractive index of the upper cladding layer 14 of the optical coupling device of this embodiment was obtained by light propagation simulation using the beam propagation method. FIG. 4 shows the result. The thickness of the upper cladding layer 14 was made equal to that (250 nm) of the Si-wire optical waveguide 13. As shown in FIG. 4, when the refractive index is 1.65 to 1.8, high-efficiency optical coupling can be achieved even when the upper cladding layer 14 is made as thin as the Si-wire optical waveguide 13.

In addition, the refractive index of the upper cladding layer 14 of the optical coupling device of this embodiment was made equal to that (1.525) of a general polymer resin, and the dependence of the coupling efficiency upon the thickness of the upper cladding layer 14 was obtained by light propagation simulation using the beam propagation method. FIG. 5 shows the result. As shown in FIG. 5, high-efficiency optical coupling can be achieved by the upper cladding layer 14 having a thickness on the submicron order (0.3 to 0.8 μm).

This makes flattening of the input/output portion of an optical interconnect possible, which is difficult by the method in which the upper cladding layer 14 is made sufficiently thick and incident light is guided in it. Accordingly, it is possible to implement an optical coupling device that makes large-scale integration with another optical device and an electronic circuit feasible, and mass production of optical interconnect LSIs based on the large-scale integration feasible.

The above results reveal the following. As a first example, when SiON having a refractive index of 1.7 is used as the upper cladding layer 14, the thickness can be 250 nm, and the width can be 4 μm. As a second example, when a polyimide-based polymer resin having a refractive index of 1.525 is used as the upper cladding layer 14, the thickness can be 700 nm, and the width can be 4 μm.

Figure 6:
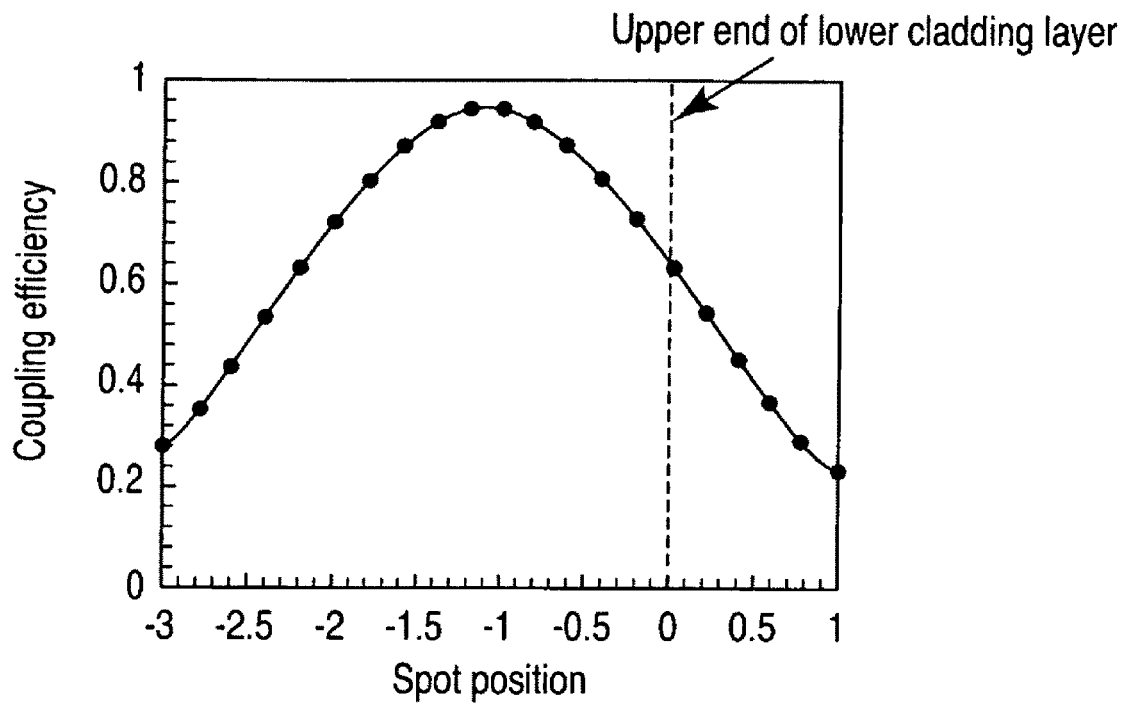
FIG. 6 is a graph showing the relationship between the central position of spot light having entered the lower cladding layer and the coupling efficiency.

Furthermore, the relationship between the coupling efficiency and the central position of spot light having entered the lower cladding layer 12 of the optical coupling device of this embodiment was checked. FIG. 6 shows the result. Note that the dependence of the optical coupling efficiency upon the spot position was obtained by light propagation simulation using the beam propagation method. The lower cladding layer 12 had a thickness of 3 μm, the Si-wire optical waveguide 13 had a thickness of 250 nm, a width of 450 nm, a taper length of 200 μm, and a distal end width of 80 nm, and the upper cladding layer 14 had a thickness of 250 nm and a width of 4 μm.

As shown in FIG. 6, a sufficiently high coupling efficiency is obtained when the central position of incident spot light is set near, more accurately, set slightly above the center of the lower cladding layer 12 in the thickness direction. That is, the coupling efficiency is maximum (95% or more) in an almost intermediate point between the upper end of the upper cladding layer 14 and the lower end of the lower cladding layer 12. A coupling efficiency of 80% or more (a coupling loss of 1 dB or less) is obtained within the range of ±0.5 μm around this point.

Note that if the spot central position largely moves (1 μm or more) in the vertical direction, the leakage of light to the air or substrate becomes significant.

As described above, this embodiment can thin and flatten the light input/output portion of an optical interconnect by thinning the upper cladding layer 14, and adopting the spot size converting structure that feeds light into the lower cladding layer 12. That is, it is possible to implement an optical coupling device that efficiently couples an optical signal propagating in an optical fiber or space to a fine optical waveguide, and facilitates integration by flattening the optical interconnect input portion. This makes large-scale integration with another optical device and an electronic circuit possible, and mass production of optical interconnect LSIs based on the large-scale integration possible.

More specifically, it is possible to efficiently couple an optical signal propagating in an optical fiber or space to a fine optical waveguide, and facilitate integration by flattening the optical interconnect input portion.

Second Embodiment

Figure 7:
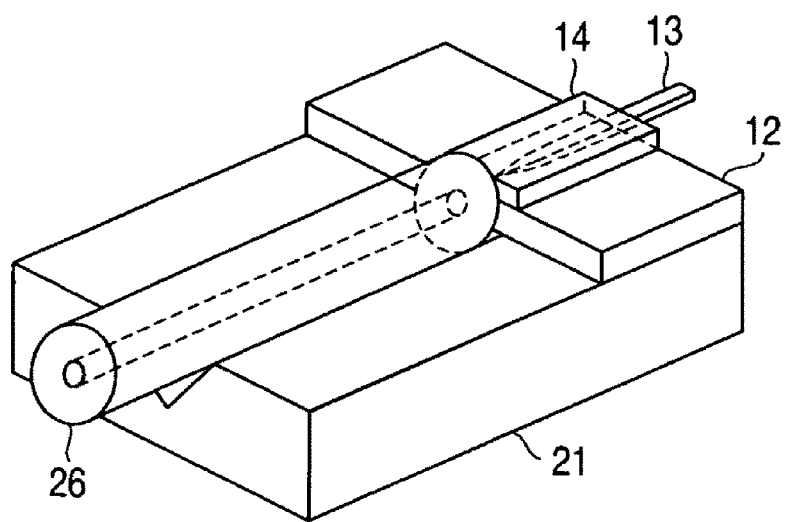
FIG. 7 is a perspective view showing an outline of the arrangement of an optical coupling device according to the second embodiment.

In this embodiment, an optical fiber is connected to an optical coupling device similar to that of the first embodiment. FIG. 7 shows an outline of the arrangement of this embodiment. Note that the same reference numerals as in FIG. 1 denote the same parts, and a repetitive explanation will be omitted.

A lower cladding layer 12 is formed on a portion of an optical fiber supporting substrate 21. An Si-wire optical waveguide 13 and upper cladding layer 14 are formed on the lower cladding layer 12 in the same manner as in the first embodiment. A V-shaped groove for positioning and fixing an optical fiber 26 is formed in the supporting substrate 21 in a direction perpendicular to the end faces of the lower cladding layer 12.

An underlying Si substrate of an SOI substrate can be used as the supporting substrate 21. That is, an underlying Si substrate 11 of an SOI substrate can be directly used as the optical fiber supporting substrate 21 by removing a buried insulating film 12 of the SOI substrate from a portion for supporting the optical fiber 26.

As in the first embodiment, the lower cladding layer 12 had a thickness of 3 μm, the Si-wire optical waveguide 13 had a thickness of 250 nm, a width of 450 nm, a taper length of 200 μm, and a distal end width of 80 nm, and the upper cladding layer 14 had a thickness of 250 nm and a width of 4 μm. When output light (wavelength=1.55 μm, spot diameter=4 μm) from a high-refractive-index optical fiber entered this optical coupling device, an optical coupling efficiency of 90% or more (a coupling loss of 0.5 dB or less) was obtained.

Third Embodiment

Although only the light input portion is described in the first embodiment, even when coupling an output from a Si-wire optical waveguide to an optical fiber, the light can be efficiently coupled by forming the same structure as that of the light input portion as the light output portion.

Figure 8:
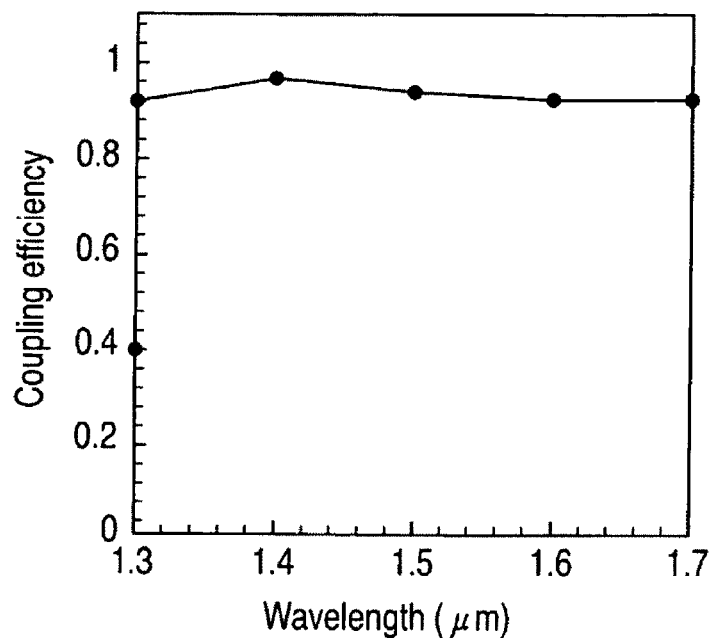
FIG. 8 is a graph showing the dependence of the coupling efficiency on the wavelength in the optical coupling device of the first embodiment.

In addition, as shown in FIG. 8, the coupling efficiency of the optical coupling device of the first embodiment is almost independent of the wavelength over the range of 1.3 to 1.7 μm. That is, high-efficiency optical coupling is obtained. Accordingly, a wavelength division multiplexing optical interconnect covering the whole range of the optical communication wavelength bands can be implemented by applying the arrangement of the optical coupling device as exemplified in the first embodiment to the input/output portions of an optical circuit.

Figure 9:
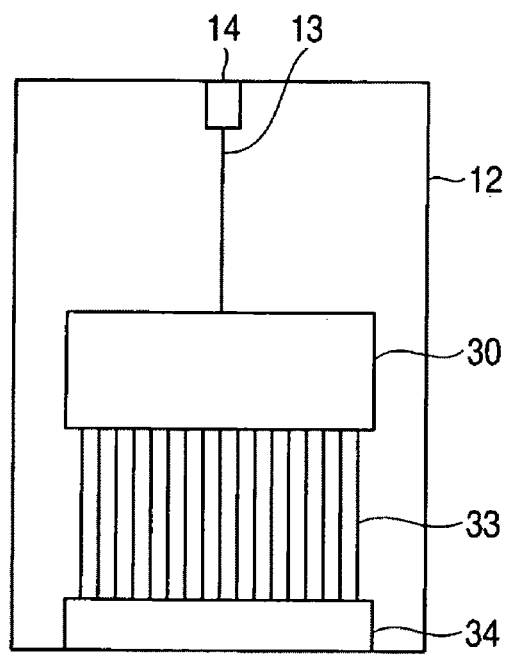
FIG. 9 is a plan view showing an application example in which an optical coupling device according to the third embodiment is applied to a wavelength division multiplexing optical interconnect.

FIG. 9 is a plan view showing an application example in which an optical coupling device according to the third embodiment is applied to a wavelength division multiplexing optical interconnect. Note that the same reference numerals as in FIG. 1 denote the same parts, and a repetitive explanation will be omitted.

A first upper cladding layer 14 is formed near one end portion of a lower cladding layer 12, and a second upper cladding layer 34 is formed near the other end portion of the lower cladding layer 12. An Si-wire optical waveguide 13 functioning as an input waveguide is formed between the lower cladding layer 12 and first upper cladding layer 14. Si-wire optical waveguides 33 functioning as output waveguides are formed between the lower cladding layer 12 and second upper cladding layer 34. A wavelength division multiplexing branching portion 30 is formed between the input waveguide 13 and output waveguides 33. The wavelength division multiplexing branching portion 30 branches input light from the input waveguide 13 to the output waveguides 33 in accordance with the wavelengths.

The conditions such as the thickness and width of the Si-wire optical waveguides 13 and 33 are the same as in the first embodiment. Although the conditions such as the material and thickness of the upper cladding layers 14 and 34 are the same as in the first embodiment, the upper cladding layer 34 is continuously formed across the optical waveguides 33.

This arrangement makes it possible to implement a wavelength division multiplexing optical interconnect covering the whole range of the optical communication wavelength bands. It is also possible to extract optical outputs branched in accordance with the wavelengths as electrical signals by using photosensors instead of the output waveguides 33.

(Modifications)

Note that the present invention is not limited to the above embodiments. Although an SOI substrate is used in each embodiment, it is not always necessary to use an SOI substrate. It is only necessary to form an optical waveguide on a portion of a lower cladding layer, and form an upper cladding layer on the optical waveguide. In addition, the materials of the upper cladding layer, lower cladding layer, and optical waveguide are not at all limited to those of the above embodiments, and can be appropriately changed in accordance with the specifications. Letting $n_1$, $n_2$, and $n_0$ be the refractive indices of the upper cladding layer, lower cladding layer, and optical waveguide, respectively, the condition indicated by $$n_2 < n_1 < n_0$$

need only hold.

Furthermore, the conditions such as the thickness and width of the upper cladding layer, the thickness of the lower cladding layer, and the thickness and width of the optical waveguide can also be appropriately changed in accordance with the specifications. These conditions are particularly preferably set within the ranges indicated by expressions (1) to (4).

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical coupling device comprising:
    a lower cladding layer formed on a substrate, light entering through a side surface of one end portion of the lower cladding layer;
    a stripe-like optical waveguide having a tapered distal end portion and formed on a portion of the lower cladding layer, the tapered distal end portion of the optical waveguide being directed to the one end portion of the lower cladding layer; and
    an upper cladding layer continuously formed on the lower cladding layer and the distal end portion of the optical waveguide from the one end portion of the lower cladding layer to the distal end portion of the optical waveguide, the upper cladding layer having a refractive index higher than that of the lower cladding layer, and configured to draw the light having entered the lower cladding layer and couple the light to the distal end portion of the optical waveguide,
    wherein a thickness $d_1$ of the upper cladding layer is defined by $$d_0 \leq d_1 \leq \lambda/n_1$$

where $d_0$ is a thickness of the optical waveguide, $\lambda$ is a wavelength of the light, and $n_1$ is the refractive index of the upper cladding layer, and
    wherein a thickness $d_2$ of the lower cladding layer is defined by $$d_2 \geq \lambda/n_2$$

where $\lambda$ is a wavelength of the light, and $n_2$ is the refractive index of the lower cladding layer.

2. The device according to claim 1, wherein a width $W_1$ of the upper cladding layer is defined by $$W_1 \geq r$$

where r is a spot diameter of the light.

3. The device according to claim 1, wherein a thickness $d_1$ of the upper cladding layer and a thickness $d_2$ of the lower cladding layer are defined by $$d_1 + d_2 \geq r$$

where r is a spot diameter of the light.

4. The device according to claim 1, wherein the following relations are established:

$$d_0 \geq d_1 \geq \lambda/n_1$$

$$d_2 > \lambda/n_2$$

$$d_1 + d_2 > r$$

$$W_1 > r$$

where $d_1$ is a thickness of the upper cladding layer, $d_2$ is a thickness of the lower cladding layer, $d_0$ is a thickness of the optical waveguide, $\lambda$ is a wavelength of the light, $n_1$ is the refractive index of the upper cladding layer, $n_2$ is the refractive index of the lower cladding layer, $W_1$ is a width of the upper cladding layer, and r is a spot diameter of the light.

5. The device according to claim 1, wherein the optical waveguide comprises a wire optical waveguide.

6. The device according to claim 5, wherein the wire optical waveguide is made of Si, and the lower cladding layer is made of $SiO_2$.

7. The device according to claim 1, wherein the lower cladding layer comprises a buried insulating film of an SOI substrate, which is obtained by forming an Si layer on the buried insulating film on an Si substrate, and the optical waveguide is formed by processing the Si layer of the SOI substrate into a line.

8. An optical coupling device comprising:
a fixing portion formed on a substrate and configured to fix an optical waveguide member; and
an optical coupling portion formed on the substrate and optically coupled with the optical waveguide member, the optical coupling portion including
a lower cladding layer formed on a substrate, and having one end portion whose side surface receives light from the optical waveguide member fixed to the fixing portion,
a stripe-like optical waveguide having a tapered distal end portion and formed on a portion of the lower cladding layer with a tip of the tapered distal end portion of the optical waveguide being directed to the one end portion of the lower cladding layer, and
an upper cladding layer continuously formed on the lower cladding layer and the distal end portion of the optical waveguide from the one end portion of the lower cladding layer to the distal end portion of the optical waveguide, having a refractive index higher than that of the lower cladding layer, and configured to draw light having entered the lower cladding layer and couple the light to the distal end portion of the optical waveguide,
wherein a thickness $d_1$ of the upper cladding layer is defined by $$d_0 \leq d_1 \leq \lambda/n_1$$

where $d_0$ is a thickness of the optical waveguide, $\lambda$ is a wavelength of the light, and $n_1$ is the refractive index of the upper cladding layer, and wherein a thickness $d_2$ of the lower cladding layer is defined by $$d_2 > \lambda/n_2$$

where $\lambda$ is a wavelength of the light, and $n_2$ is the refractive index of the lower cladding layer.

9. The device according to claim 8, wherein a width $W_1$ of the upper cladding layer is defined by $$W_1 \geq r$$

where r is a spot diameter of the light.

10. The device according to claim 8, wherein a thickness $d_1$ of the upper cladding layer and a thickness $d_2$ of the lower cladding layer are defined by $$d_1 + d_2 \geq r$$

where r is a spot diameter of the light.

11. The device according to claim 8, wherein the following relations are established:

$$d_0 \leq d_1 \leq \lambda/n_1$$

$$d_2 \leq \lambda/n_2$$

$$d_1 + d_2 \geq r$$

$$W_1 \geq r$$

where $d_1$ is a thickness of the upper cladding layer, $d_2$ is a thickness of the lower cladding layer, $d_0$ is a thickness of the optical waveguide, $\lambda$ is a wavelength of the light, $n_1$ is the refractive index of the upper cladding layer, $n_2$ is the refractive index of the lower cladding layer, $W_1$ is a width of the upper cladding layer, and r is a spot diameter of the light.

12. The device according to claim 8, wherein the optical waveguide comprises a wire optical waveguide.

13. The device according to claim 12, wherein the wire optical waveguide is made of Si, and the lower cladding layer is made of $SiO_2$.

14. The device according to claim 8, wherein the lower cladding layer comprises a buried insulating film of an SOI substrate obtained by forming an Si layer on the buried insulating film on an Si substrate, and the optical waveguide is formed by processing the Si layer of the SOI substrate into a line.

15. An optical coupling device comprising:
an SOI substrate obtained by forming an Si layer on a buried insulating film on an Si substrate;
an optical fiber fixing portion formed by partially removing the Si layer and buried insulating film of the SOI substrate, and forming a V-shaped groove in a surface of the exposed Si substrate; and
an optical coupling portion formed on the SOI substrate and optically coupled with a fiber,
the optical coupling portion including
a lower cladding layer made of the buried insulating film, and having one end portion whose side surface receives light from the optical fiber fixed to the fixing portion,
an Si-wire optical waveguide having a tapered distal end portion and formed on a portion of the lower cladding layer with a tip of the tapered distal end portion of the optical waveguide points to the one end portion of the lower cladding layer, the optical waveguide being made of the Si layer, and
an upper cladding layer continuously formed on the lower cladding layer and the distal end portion of the optical waveguide from the one end portion of the lower cladding layer to the distal end portion of the optical waveguide, having a refractive index higher than that of the lower cladding layer, and configured to draw light having entered the lower cladding layer and couple the light to the distal end portion of the optical waveguide, wherein a thickness $d_1$ of the upper cladding layer is defined by $$d_0 \leq d_1 \leq \lambda/n_1$$

where $d_0$ is a thickness of the optical waveguide, $\lambda$ is a wavelength of the light, and $n_1$ is the refractive index of the upper cladding layer, and wherein a thickness $d_2$ of the lower cladding layer is defined by $$d_2 \geq \lambda/n_2$$

where $\lambda$ is a wavelength of the light, and $n_2$ is the refractive index of the lower cladding layer.

* * * * *